(12) United States Patent
Matsui

(10) Patent No.: US 7,330,405 B2
(45) Date of Patent: Feb. 12, 2008

(54) OBJECTIVE LENS DRIVING DEVICE FOR OPTICAL HEAD

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 554 days.

(21) Appl. No.: 10/807,380

(22) Filed: Mar. 24, 2004

(65) Prior Publication Data

US 2004/0190402 A1    Sep. 30, 2004

(30) Foreign Application Priority Data

Mar. 25, 2003    (JP) .......................... P 2003-082868

(51) Int. Cl.
*G11B 7/00*    (2006.01)

(52) U.S. Cl. .................................................. 369/44.15

(58) Field of Classification Search ............. 369/44.14, 369/44.15, 44.21, 44.32; 359/814
See application file for complete search history.

(56) References Cited

U.S. PATENT DOCUMENTS

| | | | | |
|---|---|---|---|---|
| 6,295,255 | B1 * | 9/2001 | Seo et al. ................. | 369/44.32 |
| 6,466,529 | B1 * | 10/2002 | Kim et al. ................ | 369/44.32 |
| 6,724,696 | B2 * | 4/2004 | Kim et al. ................ | 369/44.16 |
| 6,829,202 | B2 * | 12/2004 | Jeong ....................... | 369/44.15 |
| 7,006,307 | B2 * | 2/2006 | Jang et al. ................ | 369/44.15 |
| 7,028,318 | B2 * | 4/2006 | Tajiri ........................ | 369/44.32 |
| 7,054,078 | B2 * | 5/2006 | Fujita .......................... | 359/814 |
| 2004/0165492 | A1 * | 8/2004 | Matsui ..................... | 369/44.32 |

FOREIGN PATENT DOCUMENTS

| | | |
|---|---|---|
| JP | 63-259842 | 10/1988 |
| JP | 2000-285490 A | 10/2000 |
| JP | 2001-110076 | 4/2001 |
| JP | 2003-85798 | 3/2003 |
| JP | 2003-85802 | 3/2003 |

* cited by examiner

*Primary Examiner*—Thang V. Tran
(74) *Attorney, Agent, or Firm*—Morgan, Lewis & Bockius LLP

(57) ABSTRACT

An objective lens driving device for an optical head has a lens holder including one or more tracking coils, one or more focusing coils, a plurality of wires which supply control currents to the tracking coils and the focusing coils and which support the lens holder in a cantilever manner, and a pair of movable magnets which are provided on a lower face of the lens holder in a track direction with an interval therebetween. A base part includes a pair of fixed magnets which are arranged so as to be opposed to the tracking coils and the focusing coils of the lens holder thereby to act thereon, a pair of right and left coils for correcting tilt angles which are arranged so as to be respectively opposed to the movable magnets thereby to act thereon, and power supply lines for supplying control currents to the tilt angle correcting coils.

6 Claims, 6 Drawing Sheets

OBJECTIVE LENS DRIVING DEVICE FOR OPTICAL HEAD

BACKGROUND OF THE INVENTION

1. Field of the Invention

The present invention relates to an objective lens driving device for an optical head which is mounted on a disk driving apparatus for an optical disk, an optical magnetic disk, etc., and more particularly, to an objective lens driving device for an optical head employing a lens having high numerical aperture which requires adjustment of a tilt angle.

2. Description of the Related Art

In an optical disk driving apparatus, an art of correcting position of an objective lens of an optical head by displacing the lens respectively in a focus direction of light and in a radial direction (a track direction) of a disk which intersects with data rows on the disk has been heretofore known.

As a conventional structure for conducting corrections in the focus direction and in the track direction, there has been known such a structure that providing coils and magnets respectively on side faces of a lens holder which holds an objective lens and outside of the lens holder, the lens holder is supported by wires so as to be displaced in the focus direction and in the track direction, and control electric currents are supplied to the afore the coils by way of these wires. This structure has permitted a compact and low-cost positional correction to be realized.

Generally, in a position correcting mechanism having the above described structure, four wires in total consisting of a pair of wires for supplying the electric currents for focus correction and another pair of wires for supplying the electric currents for track correction are used. Such a supporting system of the lens holder by means of the four wires can conduct the support and the positional correction of the objective lens in a relatively stable manner (See JP-A-2000-322752).

By the way, high densifying technique of the optical disk has been recently developed, and recording density of four to five times of that of a CD (a compact disk) has been realized in a DVD (a digital versatile disk). In order to realize a disk driving apparatus employing such a high densified optical disk, it has been necessary to increase numerical aperture (NA) of the objective lens for the purpose of increasing amounts of an emitting light, or to shorten a wavelength of a semiconductor laser (LD).

Among the above described measures, by increasing the numerical aperture of the objecting lens, a light condensing spot can be made small in diameter, and even more minute bits on the optical disk can be advantageously reproduced. On the other hand, in case where an inclination of angle occurs between the objective lens and the optical disk due to deflection or oscillation of the optical disk, this will be a factor of increasing coma aberration of the light condensing spot and deteriorating a shape of the light condensing spot, which results in such an inconvenience that noises are included in a pickup signal. For this reason, in order to realize the high numerical aperture of the objective lens, it is necessary, in addition to the positional correction in the above described focus direction and track direction, to conduct correction of the tilt angle of the objective lens according to an inclination of the disk in a radial direction, so as not to generate the inclination of angle between the objective lens and the optical disk.

As a conventional optical head in which corrections in three axial directions, namely, the focus direction, track direction and tilt angle direction are possible, there has been such a device, as disclosed in JP-A-2000-285490, for example, that a mechanism for conducting the correction in the focus direction and the track direction is provided on a base plate which can be displaced in the tilt angle direction, and this base plate is driven to rotate in the tilt angle direction by a moving magnet method (a driving method by means of fixed coils and movable magnets) or the like.

More specifically, in an "Objective Lens Driving Device" according to JP-A-2000-285490, electric currents are supplied so that directions of driving forces arising in focusing driving coils in four driving coil blocks may be opposite to each other in a radial direction of the disk with respect to a center of the objective lens, thereby to obtain the driving force in a rotation direction (a radial tilt direction) making a tangential direction of the disk as a rotation axis.

SUMMARY OF THE INVENTION

However, the above described structure has had a drawback that control of the electric currents for correcting the tilt angle has become complicated.

There has been proposed another structure in which the lens holder is provided with a particular coil for enabling the tilt angle to be corrected, separately from those coils for conducting correction in the focus direction and the track direction, and two wires are additionally provided for supplying control current to this coil. However, this structure has had such a problem that a driving force in the tilt angle direction maybe generated, and besides, a coil of a particular type having a flat structure may be required so as to be easily mounted, which leads to an increase of the cost for components. There has been a further problem that because six wires are required for three axial driving, assembling work may become more complicated as compared with the structure employing the four wires. Specifically, although the wires for supporting the lens holder must be assembled with a constant tension, it is difficult to make the tension constant in case of the six wires, because the wires may interfere one another. Thus, a problem that stabilized operation performance can be hardly obtained, due to variations in the tension of the wires, may occur.

An object of the invention is to provide an objective lens driving device for an optical head which drives the objective lens in three axial directions, namely, a focus direction, a track direction and a tilt angle direction, and has a simple structure with a decreased number of components, thereby permitting a low cost production to be realized and stabilized operation performance to be obtained.

In order to attain the above described object, there is provided according to the invention, an objective lens driving device for an optical head, including: a lens holder that holds an objective lens, the lens holder having a lower face; and a base part on which the lens holder is provided; wherein the lens holder includes: one or more tracking coils; one or more focusing coils; a plurality of wires that supply electric currents to the tracking coils and the focusing coils and support the lens holder in a cantilever manner; and a pair of movable magnets disposed on the lower face of the lens holder in a track direction with an interval therebetween; wherein the base part includes: a pair of fixed magnets arranged so as to be opposed to the tracking coils and the focusing coils of the lens holder thereby to act thereon; a pair of right and left tilt angle correcting coils arranged so as to be respectively opposed to the movable magnets thereby to act thereon; and power supply lines for supplying control currents to the tilt angle correcting coils; and wherein driving amounts in the track direction and in a focus direction are controlled by control currents supplied to the tracking coils and the focusing coils by way of the wires, and a driving amount in a tilt angle direction is controlled by the control currents supplied to the tilt angle correcting coils by way of the power supply lines.

By the above described means, it is possible to realize correction in the tilt angle direction by cooperative actions of the movable magnets provided on the lens holder and the tilt angle correcting coils provided on the base part, employing a simple and low-cost structure. Particularly, because the control current is supplied to the tilt angle correcting coils through the exclusive power supply lines, but not through the wires for supporting the lens holder, the structure will not be complicated with no need of increasing the wires in number, the production cost can be reduced, and the stabilized operation performance can be obtained.

Moreover, the movable magnets can be fixed to the lower face of the lens holder at positions adjacent to both right and left ends thereof. In this manner, the movable magnets can be arranged remote from an axis of tilting rotation, and accordingly, a large rotation moment can be obtained.

Further, a plurality of the tracking coils may be provided on a front face side and a back face side of the lens holder respectively, and the focusing coil may be wound around an outer peripheral face of the lens holder in a direction perpendicular to the focus direction. In this manner, corrections in the focus direction and in the track direction can be performed with a simple structure.

Still further, one tracking coil and one focusing coil may be adjacently disposed on a front face side of the lens holder and another tracking coil and another focusing coil may be adjacently disposed on a back face side of the lens holder, and the tracking coil on one face of the lens holder may be provided so as to be opposed to the focusing coil on another face, and each of the fixed magnets may have on one face thereof a first portion in which the S pole and the N pole or the N pole and the S pole are arranged at both sides of a first boundary line extending in a direction perpendicular of the focus direction at a position opposed to the tracking coil, and a second portion in which the S pole and the N pole or the N pole and the S pole are arranged at both sides of a second boundary line extending in the focus direction at a position opposed to the focusing coil, and the adjacent same poles in the first portion and the second portion are formed of integral ferromagnetic material which has been magnetized so as to form a single magnetic area. With this structure, the focusing coil which is wound around the outer peripheral face of the lens holder in a direction perpendicular to the focus direction can be omitted, and the structure can be simplified. As the results, the number of components can be decreased, and the production cost can be reduced.

Still further, preferably in the fixed magnet, the first boundary line is formed so as to be opposed to a straight line passing through a center of the tracking coil, and the second boundary line is formed so as to be opposed to a straight line passing through a center of the focusing coil. In this manner, the tracking coils and the focusing coils can be driven and controlled with accuracy, and stabilized operation performance can be obtained.

DETAILED DESCRIPTION OF THE PREFFERED EMBODIMENTS

Figure 1:
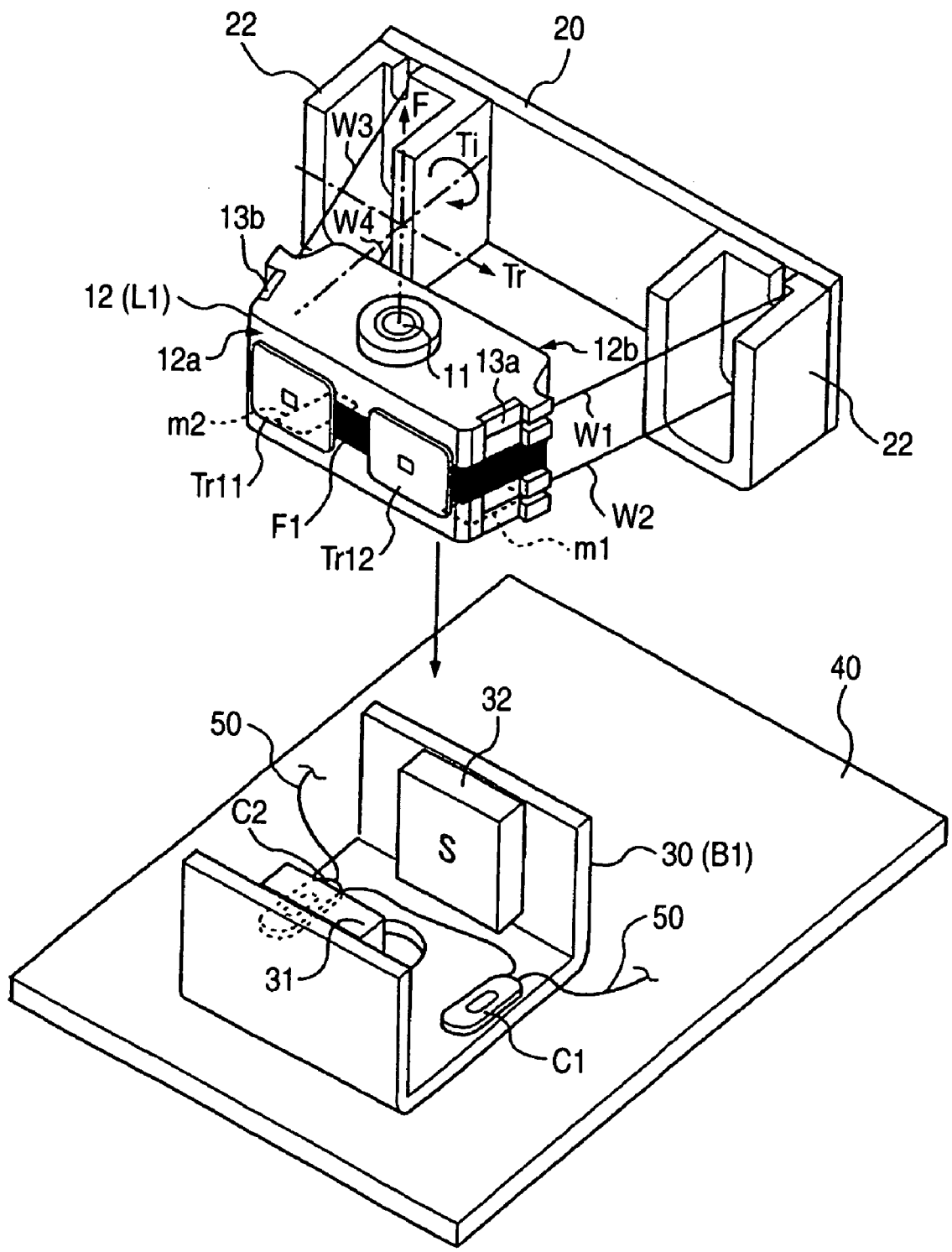
FIG. 1 is an exploded perspective view showing an objective lens driving device according to a first embodiment of the invention.

Now, embodiments of the invention will be described referring to the drawings.

Figure 2:
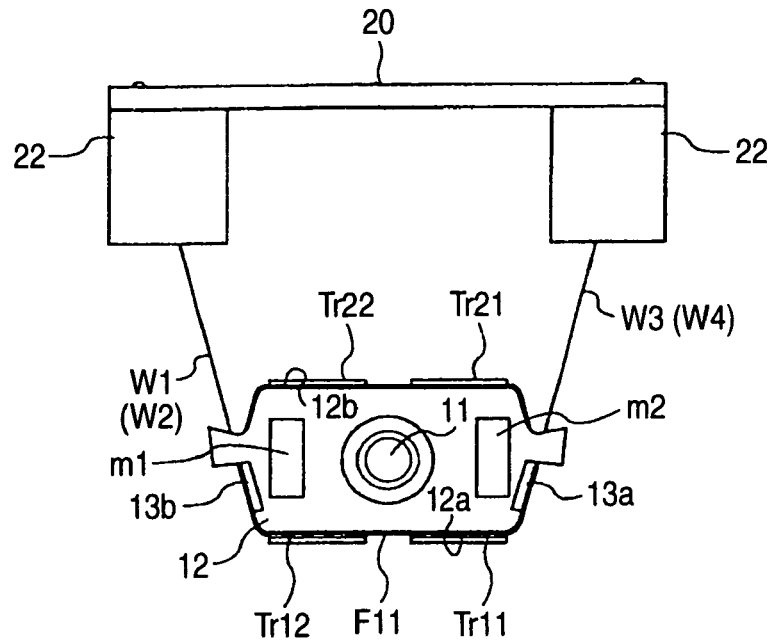
FIG. 2 is a bottom view showing a lower face of a lens holder which constitutes an essential part of the objective lens driving device in FIG. 1.
Figure 3:
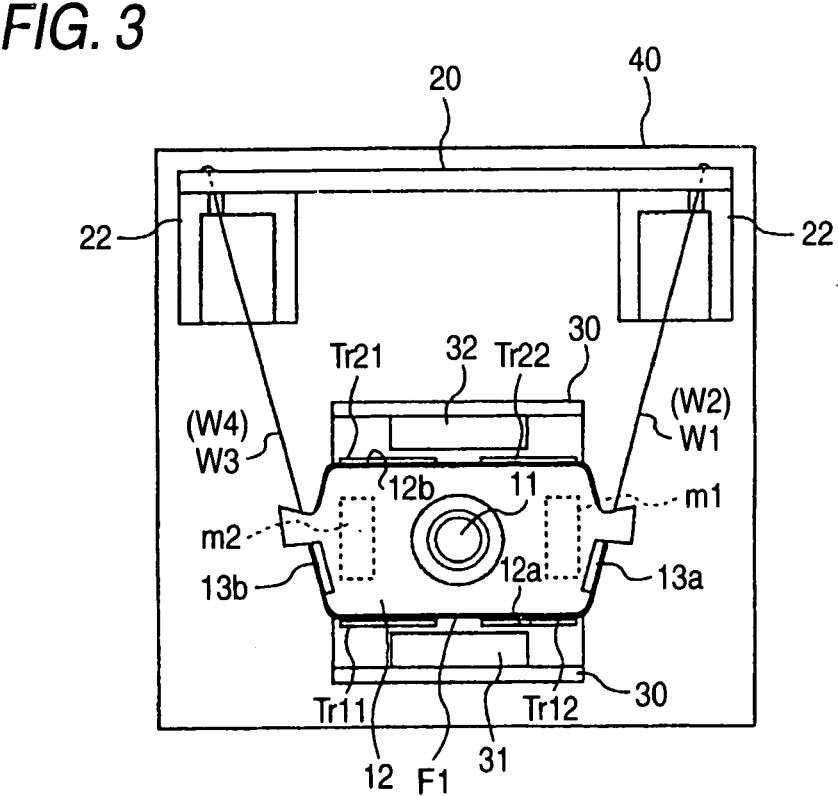
FIG. 3 is a plan view of the objective lens driving device in FIG. 1.

FIG. 1 is an exploded perspective view showing an objective lens driving device for an optical head in a first embodiment of the invention, FIG. 2 is a bottom view showing a lower face of a lens holder, and FIG. 3 is a plan view of this driving device.

The objective lens driving device in this embodiment aims to perform corrections of an objective lens of an optical head (also called as "an optical pickup") in a driving apparatus for a recordable DVD (Digital Versatile Disc) such as DVD-R, DVD-RW, etc., by conducting minute driving in three axial directions, namely, in a light focus direction F, in a radial direction (a track direction) Tr of a disk which intersects with data rows on the disk, and in a tilt angle direction Ti which corresponds to a tilt in the radial direction of the disk.

The objective lens driving device in this embodiment includes an objective lens 11 for condensing laser lights irradiated from the exterior, a lens holder 12 for holding this objective lens 11, a focusing coil F1 which is formed by winding a sheathed wire for coil in a plurality of windings on a peripheral face of the lens holder 12 in a direction perpendicular to the focus direction, square type flat tracking coils Tr11, Tr12, Tr21, Tr22 which are fixed in a pair respectively to a front face and a back face of the lens holder 12, four wires W1 to W4 which support the lens holder 12 and supply electric currents to the respective coils, and a wire board 20 to which these four wires W1 to W4 are fixed.

The coils Tr11, Tr12, Tr21, and Tr22 are electrically connected in series, and are adapted to be supplied with control currents by way of the wires W1 and W2. The focusing coil F1 is supplied with the control current by way of the wires W3 and W4.

A printed board 13a on which the wires W1, W2 are arranged and connected, and a printed board 13b on which the wires W3, W4 are arranged and connected are fitted into recesses formed in both side parts of the lens bolder 12, whereby the wires W1 to W4 and the lens holder 12 are secured in appropriate positions. Besides, the wires W1 to W4 and those wires arranged in the lens holder 12 are electrically connected to each other.

As shown in FIGS. 2 and 3, the wires W1 to W4 are diagonally extended from the lens holder 12 and soldered to the wire board 20 at their one ends. The wire board 20 is provided with gel boxes 22 to be filled with buffer gel for preventing sympathetic vibrations, in a range which the wires W1 to W4 pass through. The wires W1 to W4 are prevented from the sympathetic vibrations by passing through this buffer gel (not shown).

As shown in the bottom view of FIG. 2, tilt angle correcting magnets m1, m2 are rigidly fixed to the lower face of the lens holder 12 at right and left opposite ends thereof. Polarities of the magnets m1, m2 in their faces opposed to tilt angle correcting coils C1, C2, which will be described below, are determined so as to generate suction forces or repulsive forces when the tilt angle correcting coils C1, C2 are energized. Specifically, the magnets m1, m2 are mounted in such a manner that the polarities of the lower faces of the magnets m1, m2 may be opposite to each other, the N pole to the S pole, in case where the electric currents flowing through the tilt angle correcting coils C1, C2 are in the same direction, and the polarities of the lower faces of the magnets m1, m2 may be the same, in case where the electric currents flowing through the coils C1, C2 are in the opposite directions.

On the other hand, on a holder body 30 on which the lens holder 12 is provided with predetermined gaps, there are rigidly fixed two magnets 31, 32 which are arranged so as to be opposed to the front face and the back face of the lens holder 12 provided with the coils Tr11 to Tr22.

The holder body 30 and the wire board 20 are provided on a base frame 40.

Polarities of the magnets 31, 32 on their faces opposed to the tracking coils Tr11 to Tr22 and the focusing coil F1 are determined so as to generate suction forces or repulsive forces when these coils Tr11 to Tr22 and F1 are energized. In the embodiment as shown in FIG. 1, the magnets 31, 32 are fixed so that both the polarities of their inner faces are the S pole. In case where the electric currents flowing through the respective coils are in opposite directions, both the polarities of the inner faces of the magnets 31, 32 can be the N pole.

The tilt angle correcting coils C1, C2 are provided on a flat plate part of the holder body 30 in right and left end areas thereof, so as to be opposed to the tilt angle correcting magnets m1, m2 which are rigidly fixed to the lower face of the lens holder 12, when a lens holder part L1 is interposed on a base part B1. These tilt angle correcting coils C1, C2 can be formed of square type flat coils, though not particularly limited. The coils C1 and C2 are electrically connected in series, and supplied with the control currents by way of power supply lines 50 which are connected to the coils C1, C2.

Each of the square type flat tracking coils Tr11 to Tr22 is a thin type coil formed of a wound conductive wire which is wound in a direction along four sides of a square, and a size and number of the windings are the same in all the coils.

According to such a structure, by appropriately controlling the electric currents passed through the tracking coils Tr11 to Tr22 and the focusing coil F1 by way of the wires W1 to W4, minute driving forces in the track direction Tr and in the focusing direction F will be generated in the lens holder 12, thus enabling correction of position of the objective lens in the track direction and in the focus direction to be conducted.

Moreover, by appropriately controlling the electric currents passed through the tilt angle correcting coils C1, C2 by way of the power supply lines 50, a minute driving force in the tilt angle direction Ti will be generated in the lens holder 12, thus enabling correction of the tilt angle to be conducted.

For example, in case where the coil C1 is supplied with the electric current in right turn, and the coil C2 is supplied with the electric current in left turn, repulsion will be exerted on the magnet m1 and attraction will be exerted on the magnet m2, and the lens holder 12 will be tilted so as to be elevated at the right side and lowered at the left side. By contrast, in case where the coil C1 is supplied with the electric current in left turn, and the coil C2 is supplied with the electric current in right turn, attraction will be exerted on the magnet m1 and repulsion will be exerted on the magnet m2, and the lens holder 12 will be tilted so as to be lowered at the right side and elevated at the left side. In this manner, by appropriately controlling the electric currents passed through the tilt angle correcting coils C1, C2, correction of the tilt angle can be realized.

Further, the supply of the control currents to the tilt angle correcting coils C1, C2 is conducted by the power supply lines 50 which are exclusive for the purpose, without using the wires W1 to W4 for supporting the lens holder 12. Therefore, the structure will not be complicated with no need of increasing the wires in number. As the results, production cost can be reduced, and at the same time, stabilized operation performance can be obtained.

Referring now to FIGS. 4 to 7, an objective lens driving device in a second embodiment will be described.

It is to be noted that the same components as in the first embodiment will be denoted with the same reference numerals, and their detailed description will be omitted.

Figure 4:
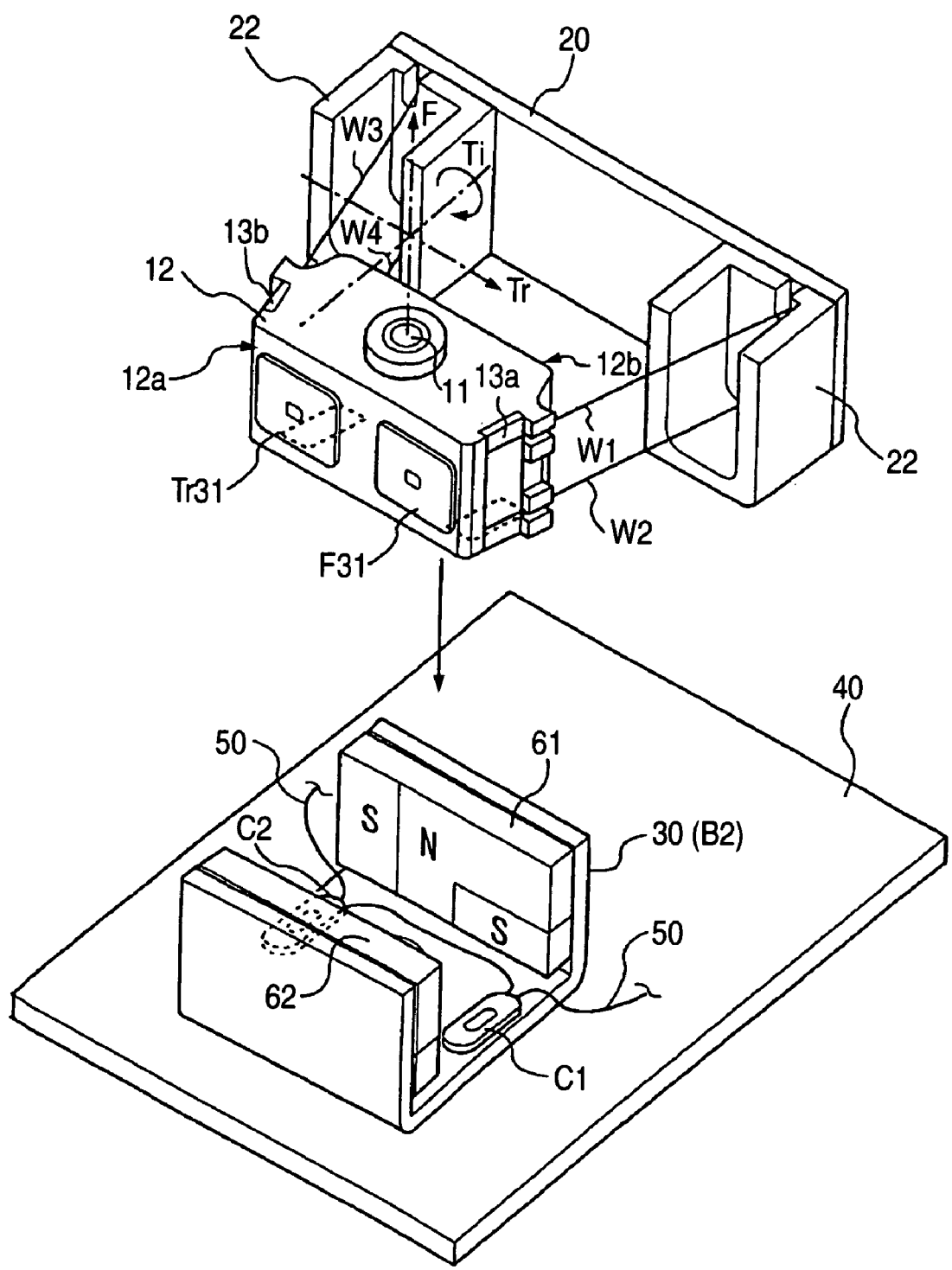
FIG. 4 is an exploded perspective view showing an objective lens driving device according to a second embodiment of the invention.
Figure 6A:
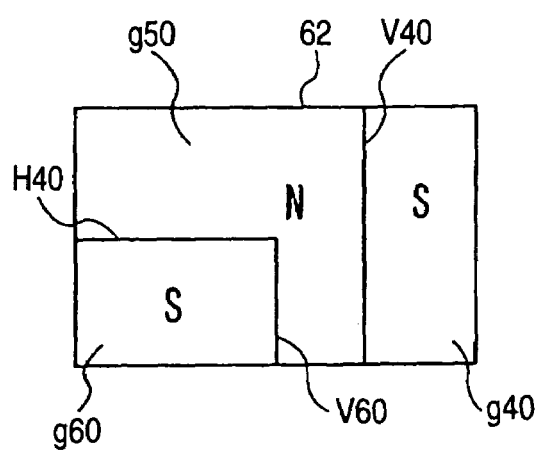
FIGS. 6A and 6B are views for explaining another example of positional relation of the magnetic poles appearing in the magnets with respect to the square type flat coils fixed to the lens holder.
Figure 6B:
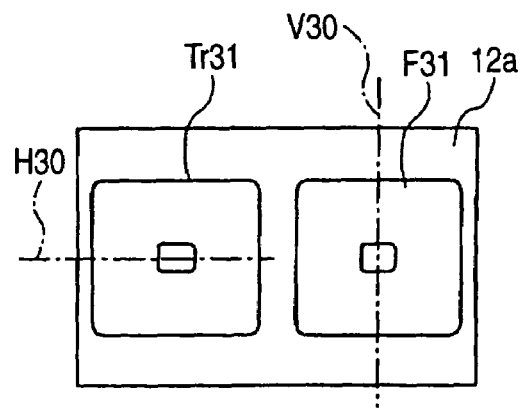
Figure 7:
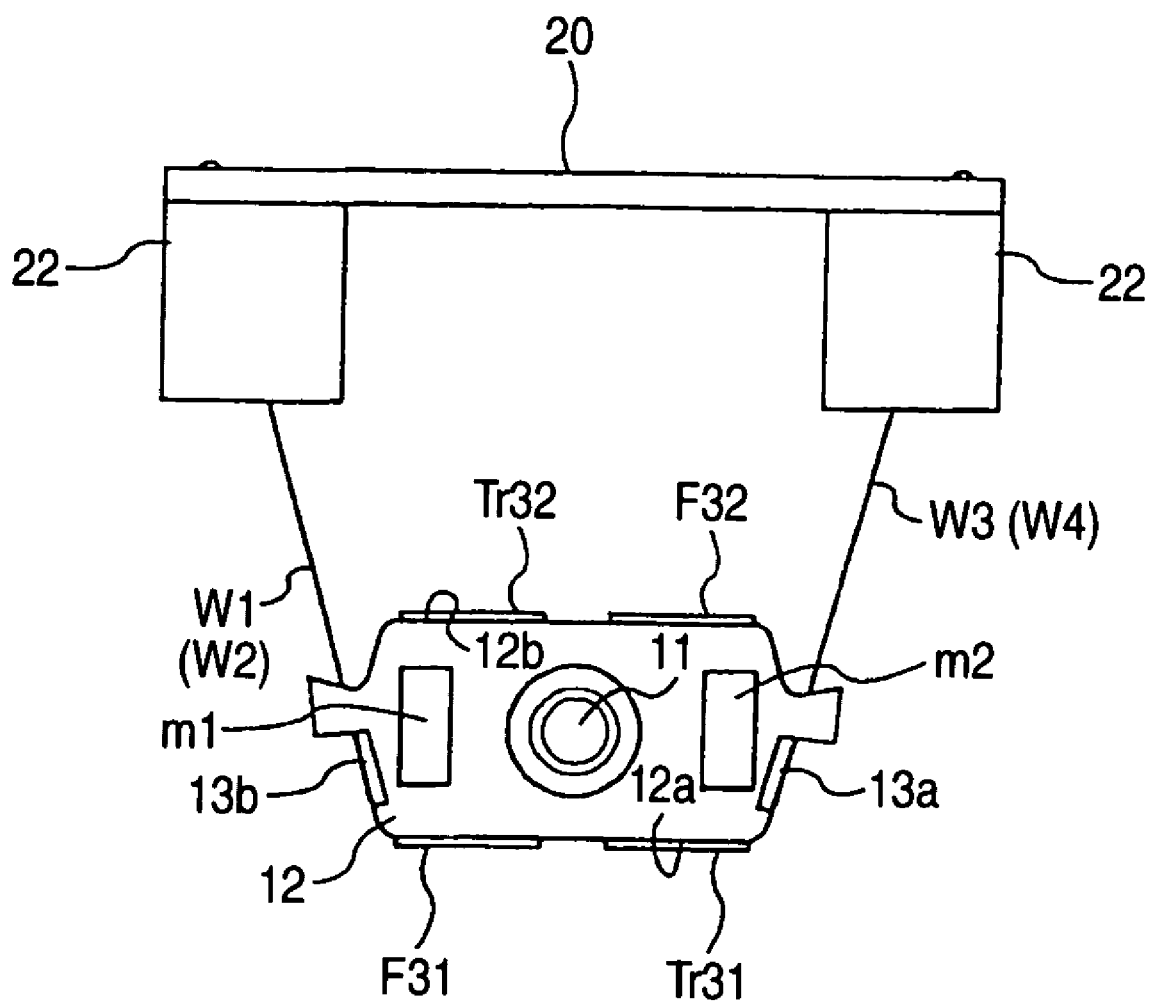
FIG. 7 is a bottom view showing a lower face of the lens holder which constitutes an essential part of the objective lens driving device in FIG. 4.

FIG. 4 is an exploded perspective view showing an objective lens driving device for an optical head in the second embodiment, FIGS. 5 and 6 are views for explaining positional relation of magnetic poles appearing in magnets with respect to square type flat coils fixed to the lens holder, and FIG. 7 is a bottom view of the lens holder which constitutes the essential part of the objective lens driving device.

In the second embodiment, different from the first embodiment, there is provided no focusing coil F1 which is wound around the peripheral face of the lens holder 12 in a direction perpendicular to the focus direction.

In the second embodiment, of two pairs of square type flat coils which are provided respectively in two rows on a front face 12a and a back face 12b of the lens holder 12, one pair are employed as tracking coils Tr31 and Tr32, and the other pair are employed as focusing coils F31, F32.

As shown in the bottom view of FIG. 7, the tracking coils Tr31, Tr32 are provided on the front face and the back face of the lens holder 12 in axially symmetrical positions with respect to a center axis of the objective lens 11. In the same manner, the focusing coils F31, F32 are also provided on the front face and the back face of the lens holder 12 in axially symmetrical positions with respect to the center axis of the objective lens 11.

Moreover, the tracking coils Tr31, Tr32 are electrically connected in series, and supplied with the control currents by way of the wires W1 and W2. The focusing coils F31, F32 are electrically connected in series, and supplied with the control currents by way of the wires W3 and W4.

On the other hand, there are provided on the base part B2, two magnets 61, 62 which are integrally magnetized and arranged so as to be opposed to the front face and the back face of the lens holder 12 on which the coils Tr31, F31, Tr32, F32 are provided.

Figure 5A:
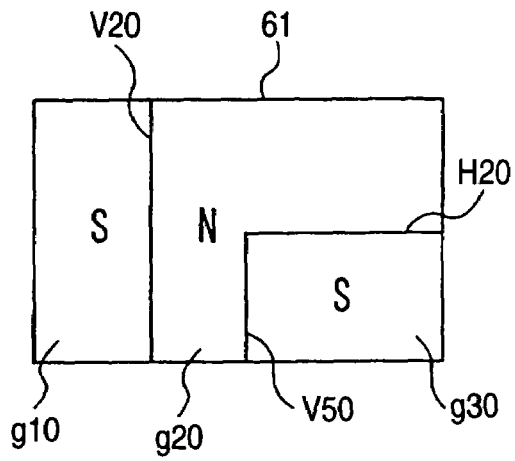
FIGS. 5A and 5B are views for explaining an example of positional relation of magnetic poles appearing in magnets with respect to square type flat coils fixed to a lens holder.
Figure 5B:
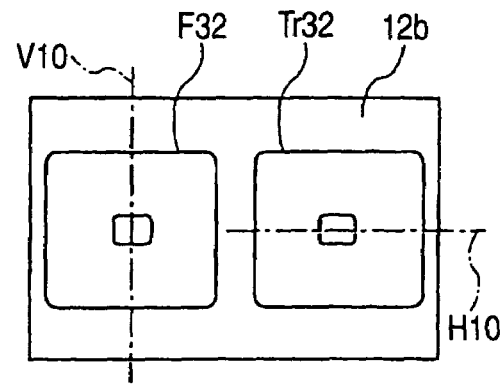

As shown in FIGS. 5A and 5B, a magnetic arc of the magnet 61 is divided into three regions, namely regions g10, g30 in a rectangular shape, and a region g20 in an inverted L-shape, by a vertical boundary line V20 opposed to a vertical line V10 passing through a center of the focusing coil F32, a horizontal boundary line H20 opposed to a horizontal line H10 passing through a center of the tracking coil Tr32, and a vertical boundary line V50 which is perpendicular to the boundary line H20. The regions are magnetized in such a manner that the adjacent regions have different poles from each other (in the example as shown in FIG. 5A, the regions g10 and g30 have the S pole, while the region g20 has the N pole).

As shown in FIGS. 6A and 6B, a magnetic field of the magnet 62 which is provided so as to be opposed to the magnet 61 is divided into three regions, namely regions g40, g60 in a rectangular shape, and a region g50 in an inverted L-shape, by a vertical boundary line V40 opposed to a vertical line V30 passing through a center of the focusing coil F31, a horizontal boundary line H40 opposed to a horizontal line H30 passing through a center of the tracking coil Tr31, and a vertical boundary line V60 which is perpendicular to the boundary line H40. The regions are magnetized in such a manner that the adjacent regions have different poles from each other (in the example as shown in FIG. 6A, the regions g40 and g60 have the S pole, while the region g50 has the N pole).

It is to be noted that the polarities of the above described regions (g10 to g30 and g40 to g60) may be reversed depending on the control of the electric currents to the tracking coils Tr32, Tr31, and the focusing coils F31, F32.

According to such a structure, by appropriately controlling the electric currents passed through the tracking coils Tr32, Tr31 by way of the wires W1 and W2, it is possible to generate a minute driving force in the track direction Tr in the lens holder 12 thereby to correct the position of the objective lens in the track direction.

Moreover, by appropriately controlling the electric currents passed through the focusing coils F31, F32 by way of the wires W3 and W4, it is possible to generate a minute driving force in the focus direction F in the lens holder 12 thereby to correct the position of the objective lens in the focus direction. Particularly, according to the present embodiment, because the drive in the focus direction can be performed by the two focusing coils F31, F32 which are axially symmetrically provided, a force in a twisting direction will not be created, and so, more accurate correction of the position in the focus direction can be performed.

As for correction of the tilt angle, by appropriately controlling the electric currents passed through the tilt angle correcting coils C1, C2 by way of the power supply lines 50, in the same manner as in the first embodiment, a minute driving force in the tilt angle direction Ti will be generated in the lens holder 12, and thus, the correction of the tilt angle can be performed.

As described, in the second embodiment, the focusing coil F1 which is wound around the peripheral face of the lens holder 12 in a direction perpendicular to the focus direction can be omitted. Therefore, it is advantageous that the structure can be simplified, and the production cost can be reduced by decreasing the components in number.

Moreover, the objective lens driving devices according to the first and second embodiments are not provided with yokes (reference should be made to FIG. 8 in which yokes 30A, 30B are provided) for making lines of induction extending from the magnets to the base parts B1, B2 more straight. This enables the structure of the lens holder 12 to be simplified. Accordingly, subsidiary resonant frequency of the lens holder 12 can be made higher, and occurrence of the subsidiary resonance can be restrained.

MODIFIED EXAMPLE

Figure 8:
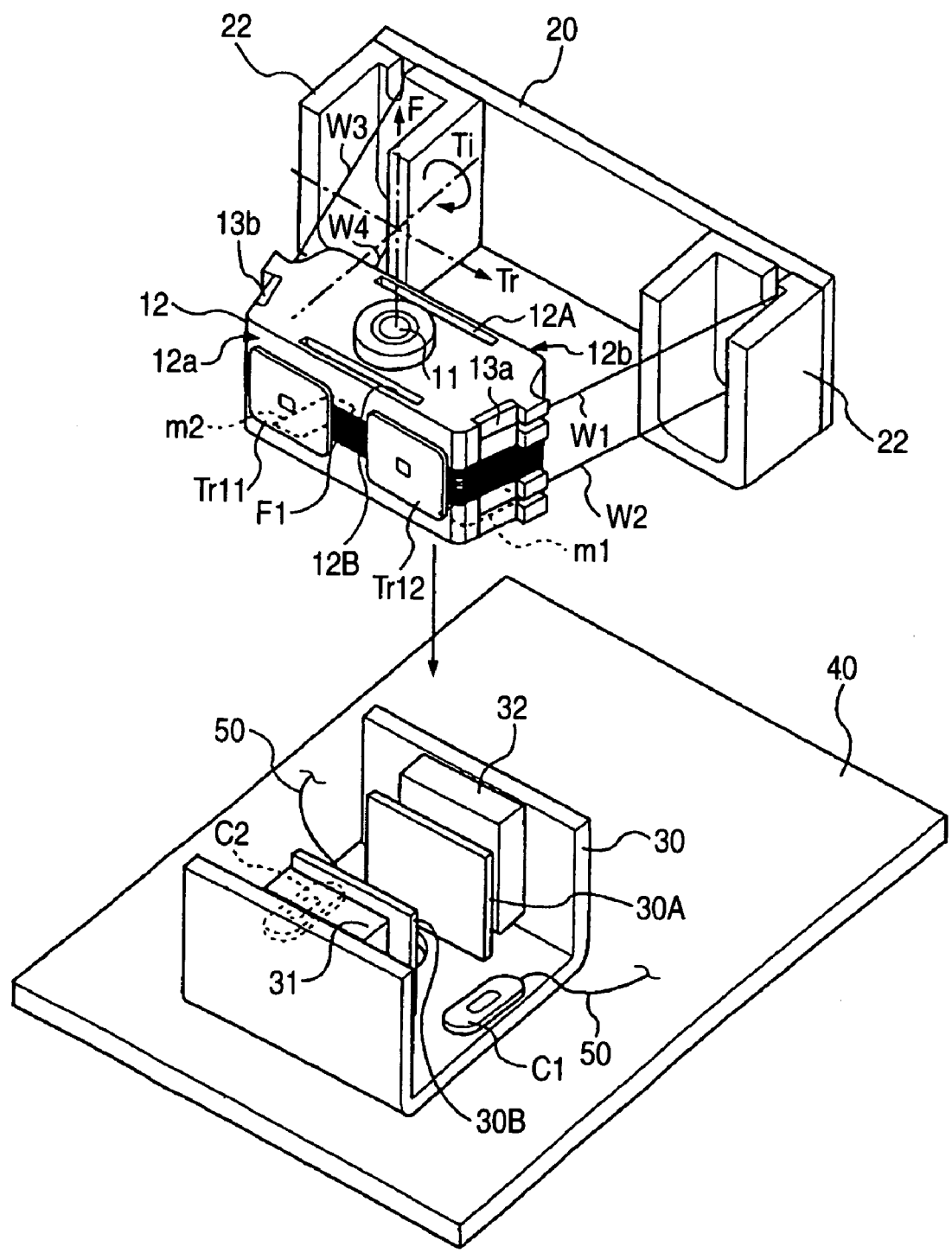
FIG. 8 is an exploded perspective view showing an objective lens driving device in a modified example of the invention.

FIG. 8 shows another embodiment of the objective lens driving device according to the invention.

Although the yoke members for making the lines of induction extending from the magnets 31, 32 more straight are not provided in the first embodiment as shown in FIG. 1, it is also possible to construct the device in such a manner that the yoke members 30A, 30B are uprightly provided on the holder body 30, as shown in FIG. 8, while the lens holder 12 is formed with through holes 12A, 12B for the yoke members 30A, 30B to pass through. In this case, the holder body 30 is formed of magnetic material.

By providing the yoke members 30A, 30B in this manner, the lines of induction extending from the magnets 31, 32 can be made more straight as compared with the case where the yoke members 30A, 30B are not provided. As the results, drive and control of the objective lens by the control currents passed through the square type flat tracking coils Tr11, Tr12, Tr21, Tr22 and the focusing coil F1 can be stabilized, and the driving force can be increased.

It is to be noted that the present invention is not limited to the above described embodiments, but various modifications can be made. For example, the magnets m1, m2 may not be necessarily provided adjacent to the right and left ends of the lower face of the lens holder 12 as shown in the above described embodiments, but it would be sufficient that the magnets m1, m2 are provided equidistantly from a center line of the objective lens 11 in the track direction of the lower face of the lens holder 12.

In this case, the tilt angle correcting coils C1, C2 should be provided at positions opposed to these magnets m1, m2.

Although the above described embodiments have been described referring to the case where the tilt angle correcting coils C1, C2 are electrically connected in series, it is possible to control the tilt angle correcting coils C1, C2, by supplying the electric currents separately, without connecting the coils C1 and C2.

Moreover, the above described embodiments have been described referring to the case where the invention is applied to the objective lens driving device for the optical head which is mounted on the DVD drive. However, the invention can be applied to various other objective lens driving devices, such as an objective lens driving device for an optical head for an optical magnetic disk, an objective lens driving device for an optical head which is mounted on a disk drive for conducting recording and reproduction employing violet laser.

As has been described above, according to the invention, it is advantageous that correction of the objective lens in the tilt angle direction can be realized with a simple and low-cost structure.

Particularly, because the supply of the control currents to the tilt angle correcting coils can be made by way of the exclusive power supply lines without employing the wires for supporting the lens holder, it would be advantageous that the structure will not be complicated with no need of increasing the wires in number, the production cost can be reduced, and the stabilized operation performance can be obtained.

What is claimed is:

1. An objective lens driving device for an optical head, comprising:
   a lens holder that holds an objective lens, the lens holder having a front face, a back face, side faces and a lower face; and
   a base part on which the lens holder is provided;
   wherein the lens holder comprises:
   tracking coils formed of square type flat coils of the same size, one pair of the tracking coils arranged on a front face side of the lens holder and another pair of the tracking coils arranged on a back face side of the lens holder respectively in a track direction perpendicular to a focus direction with an interval therebetween and connected in series;
   a focusing coil that is wound around the front face, the back face and the side faces of the lens holder in a plane perpendicular to the focus direction;
   first and a second wires arranged on one side face of the lens holder to support the lens holder, and adapted to supply control currents to the tracking coils;
   third and a fourth wires arranged on another side face of the lens holder to support the lens holder, and adapted to supply control current to the focusing coil; and
   a pair of movable magnets for correcting a tilt angle, the pair of movable magnets disposed on the lower face of the lens holder at positions adjacent to both right and left ends thereof;
   wherein the base part comprises:
   a pair of fixed magnets arranged so as to be opposed to the tracking coils and the focusing coil of the lens holder in a direction perpendicular to the focus and track directions to thereby act thereon;
   a pair of right and left tilt angle correcting coils for correcting the tilt angle which are connected in series and arranged so as to be respectively opposed to the movable magnets to thereby act thereon; and
   power supply lines for supplying control currents to the tilt angle correcting coils; and
   wherein a driving amount in the track direction is controlled by the control currents supplied by way of the first wire and the second wire, a driving amount in the focus direction is controlled by the control currents supplied by way of the third wire and the fourth wire, and a driving amount in the tilt angle direction is controlled by the control currents supplied by way of the power supply lines.

2. An objective lens driving device for an optical head, comprising:
   a lens holder that holds an objective lens, the lens holder having a lower face; and
   a base part on which the lens holder is provided;
   wherein the lens holder comprises:
   one or more tracking coils;
   one or more focusing coils;
   a plurality of wires that supply electric currents to the tracking coils and the focusing coils and support the lens holder in a cantilever manner; and
   a pair of movable magnets disposed on the lower face of the lens holder in a track direction with an interval therebetween;
   wherein the base part comprises:
   a pair of fixed magnets arranged so as to be opposed to the tracking coils and the focusing coils of the lens holder thereby to act thereon;
   a pair of right and left tilt angle correcting coils connected in series and arranged so as to be respectively opposed to the movable magnets thereby to act thereon; and
   power supply lines for supplying control currents to the tilt angle correcting coils; and
   wherein driving amounts in the track direction and in a focus direction are controlled by control currents supplied to the tracking coils and the focusing coils by way of the wires, and a driving amount in a tilt angle direction is controlled by the control currents supplied to the tilt angle correcting coils by way of the power supply lines, and
   wherein the pair of fixed magnets are disposed in a direction perpendicular to the focus and track directions.

3. The objective lens driving device for an optical head as claimed in claim 2, wherein the movable magnets are fixed to the lower face of the lens holder at positions adjacent to both right and left ends thereof.

4. The objective lens driving device for an optical head as claimed in claim 2, wherein a plurality of the tracking coils are provided on a front face side and a back face side of the lens holder respectively; and
   wherein the focusing coil is wound around an outer peripheral face of the lens holder in a direction perpendicular to the focus direction.

5. The objective lens driving device for an optical head as claimed in claim 2, wherein one tracking coil and one focusing coil are adjacently disposed on a front face side of the lens holder and another tracking coil and another focusing coil are adjacently disposed on a back face side of the lens holder, and the tracking coil on one face of the lens holder is provided so as to be opposed to the focusing coil on another face; and
   wherein each of the fixed magnets has on one face thereof a first portion in which the S pole and the N pole or the N pole and the S pole are arranged at both sides of a first boundary line extending in a direction perpendicular of the focus direction at a position opposed to the tracking coil, and a second portion in which the S pole and the N pole or the N pole and the S pole are arranged at both sides of a second boundary line extending in the focus direction at a position opposed to the focusing coil, and the adjacent same poles in the first portion and the second portion are formed of integral ferromagnetic material which has been magnetized so as to form a single magnetic area.

6. The objective lens driving device for an optical head as claimed in claim 5, wherein in the fixed magnet, the first boundary line is formed so as to be opposed to a straight line passing through a center of the tracking coil, and the second boundary line is formed so as to be opposed to a straight line passing through a center of the focusing coil.

* * * * *